United States Patent [19]

Mayr et al.

[11] Patent Number: 4,457,583
[45] Date of Patent: Jul. 3, 1984

[54] METHOD OF MAKING AN OPTICAL FIBER CABLE

[75] Inventors: Ernst Mayr, Starnberg; Ulrich Oestruch, Munich, both of Fed. Rep. of Germany

[73] Assignee: Siemens Aktiengesellschaft, Berlin and Munich, Fed. Rep. of Germany

[21] Appl. No.: 267,665

[22] Filed: May 27, 1981

[30] Foreign Application Priority Data

Jun. 27, 1980 [DE] Fed. Rep. of Germany ....... 3024310

[51] Int. Cl.³ .............................................. G02B 5/14
[52] U.S. Cl. .................................... 350/96.23; 57/314
[58] Field of Search ............. 350/96.23; 57/63, 58.83, 57/314, 362, 408; 264/1.5

[56] References Cited

U.S. PATENT DOCUMENTS

| 4,239,335 | 12/1980 | Stiles | 350/96.23 |
| 4,248,035 | 2/1981 | Skillen et al. | 350/96.23 |
| 4,312,566 | 1/1982 | Jackson | 350/96.23 |
| 4,355,865 | 10/1982 | Conrad et al. | 350/96.23 |

FOREIGN PATENT DOCUMENTS

| 2513722 | 9/1976 | Fed. Rep. of Germany ... 350/96.23 |
| 2641166 | 3/1977 | Fed. Rep. of Germany ... 350/96.23 |
| 2728658 | 1/1979 | Fed. Rep. of Germany . |
| 2296192 | 7/1976 | France ............................ 350/96.23 |

OTHER PUBLICATIONS

*The Random House College Dictionary*, 1980, revised edition, Random House Inc., p. 490.
Siecor Optical Cables, Inc., *Siecor General Purpose Optical Cables*, Jun. 1979, (Brochure).

*Primary Examiner*—John D. Lee
*Assistant Examiner*—Frank González
*Attorney, Agent, or Firm*—Hill, Van Santen, Steadman & Simpson

[57] ABSTRACT

An optical cable having at least one optical light waveguide arranged in a protective covering or shell and including at least one support element characterized by each of the support elements consisting of stranded threads impregnated with a hardening resin and covered with a protective layer and the support elements being stranded onto the protective covering or shell of the light waveguide. The method of manufacturing the cable includes providing each of the support elements by providing a plurality of threads, stranding said threads together into a group and impregnating with resin each of the groups of strands of the stranded threads, subsequently covering each of the impregnated groups with the protective layer which permits a subsequent hardening of the resin, to form the element and then subsequently providing a light waveguide received in a protective covering and stranding the support elements onto the protective covering of the waveguide to form the cable.

15 Claims, 3 Drawing Figures

METHOD OF MAKING AN OPTICAL FIBER CABLE

BACKGROUND OF THE INVENTION

The present invention is directed to an optical cable which includes at least one optical light waveguide arranged loosely or fixedly in a protective covering or sheath and at least one support element.

Cable constructions with light waveguides have a general difficulty which consists in longitudinal changes, which are often due to shrinkage, very readily occurring either during or following thermal stresses, and these changes raise the attenuation in the waveguide as a consequence of impermissible bending of the waveguide. It is known to surround a light waveguide such as optical fibers themselves with longitudinally stabilizing securely positioned coverings or sheaths. In addition, an optical fiber is known from German O.S. No. 27 28 658 in which the optical cable has at least one optical fiber or light conducting waveguide which is stranded with support elements with at least one support element being disposed in the center of the cable. The core of the cable, which consists of the support elements and the light waveguides which are preferably arranged in hollow sheaths, is externally covered with a plastic band or jacket and is surrounded by a cladding or sheath consisting of a particularly resistive plastic.

The support elements, which are intended to primarily prevent a short radius bending of the light waveguides as a consequence of a longitudinal shortening of the covering sheaths or shells, thus satisfy other tasks than the conventional support elements. For example, instead of just protecting the light waveguide against tensile stresses, the support elements must be decentrally stranded or cabled in a specific cable construction so that in addition to the support effect, they may also provide a satisfactory flexibility. Insofar as they must be fully insulating, only stranded or twined threads or yarns can be considered for this purpose.

However, the difficulty which arises here is that such threads, which are stranded together without a corresponding hardening or bonding agent to securely seal or cement the individual threads or yarns together exhibits no supportive effect whatsoever in the case of a longitudinally directed compressive forces. To retain the flexibility of the cable, the individual support elements cannot be permitted to become cemented to each other. Also no mechanical connection is permitted to arise between the light waveguides or their covering such as the sheath or envelope and the support elements, which connection would influence the flexibility of the cable in an unfavorable manner.

SUMMARY OF THE INVENTION

The present invention is directed to providing an optical cable, which has at least one optical waveguide arranged in a protective covering or shell and includes at least one support element in which the support element may be fabricated from a plurality of threads which are impregnated with a hardening resin but will not be mutually cemented to other support elements or to the light waveguides or the sheath or covering of the light waveguide. In addition, the cable of the present invention can be manufactured in a simple fashion.

To achieve these tasks, the present invention is directed to an improvement in an optical cable having at least one optical light waveguide arranged in a protective covering or sheath and including at least one support element. The improvement comprises means for supporting longitudinally directed compressive forces, said member being each of the support elements consisting of a plurality of stranded threads impregnated with a hardening resin, said impregnated threads being provided with a protective layer and said support element being stranded onto the protective covering or sheath of the light waveguide.

The support elements constructed in this fashion thus has the property that in spite of relative great flexibility, they are sufficiently rigid or stiff in order to be able to jointly provide a satisfactory support effect when cabled into a cable assembly or when cabled onto an exiting cable assembly. Thus, each support element simultaneously has an improved tensile strength and abrasion resistance when compared with non impregnated support elements or impregnated support elements that are not provided with a protective layer or covering. Within the protective covering, the described support element can also consist of several threads or twines which are stranded together with one another. The protective covering or layer also permits a subsequent age hardening or curing of the impregnating agent.

It is particularly expediently to use glass threads or twines for the threads of the support element. These glass threads or twines exhibit good mechanical properties and can be readily stranded. Examples are commercial threads of "E" or "S" glass. Beneath the subsequently applied protective layer, the binding or impregnating resin can cure without special measures when subjected to moderate temperatures. Thus, in the process of forming the support elements, the speed can be greatly increased and the process is simplified. At the same time, the plastic envelope keeps the resin impregnated threads or fiber approximately round in cross-section even if the latter has been wound up without any particular caution. The round shape of the cross-section of the element is of great significance for a uniform flexibility.

The protective layer advantageously consists of a thermal plastic layer preferably applied in a extrusion and stretching process. For this purpose, a particularly useful material for the protective layer is a fluorine polymer for example FEP, PFA or PVDF (fluoronoted ethylenpropylene, perfluoroalkoxy, polyvinylidenefluoride). These materials have the advantage that they are also largely flame resistant which is a property which can usually be obtained only in a metallic support element.

Insofar as a property of flame resistance is not needed then polyimides, polyesters or thermoplastic polyurethanes can also be employed insofar as they possess the high gram molecular weight which is required for the material being used for the protective layer.

The invention furthermore relates to a method for manufacturing the optical cable which is characterized by the steps of providing each of the support elements by providing a plurality of threads, stranding said threads together, and impregnating each group of stranded threads with a hardening resin, subsequently covering each of the impregnated groups with a protective layer to produce the support element and subsequently providing a light waveguide received in a protective covering and stranding the support elements onto the protective covering of the waveguide to form the cable. This process enables the curing of the resin to occur while the support element is being coiled prior to joining with the waveguide to form the cable or to occur after the cable has been formed by stranding the support elements with the waveguide. The process also offers possibilities of stranding or cabling of a noncured support element with torsion such as without a back twist.

Further features of the invention are that after forming the cable in accordance to the method, an outer cladding layer is either sprayed or extruded onto the cable of waveguides and support elements. The heat that occurs during the application of the external cladding layer may be used as the heat for the purposes of hardening of the resin of each of the support elements. In addition, the support elements can be stranded on the cable in an SZ method if desired.

With regard to the cable itself, it is noted that the optical waveguide can be either loosely or securely fixed in the protective covering of its sheath or shell. It is also possible that the hollow space within the sheath is filled with a soft foam or aerated plastic so that the fiber forming the optical waveguide is softly held by the solid filling material in its sheath or shell.

The hardening resin which is used for impregnating the fibers forming the support element may be an epoxy resin. The protective layer can consist of a thermoplastic layer. The thermoplastic layer may be of a fluorine polymer or the thermoplastic layer may be selected from a group consisting of polyesters, polyamides and thermoplastic polyurethane. In any case, the protective layer may be of a thickness of 20 to 100 $\mu$m. While the threads or fibers that are twisted and impregnated to form the support element may be glass threads or fibers, they can also be formed of plastic fibers such as aramide fibers.

When stranding the support elements onto the outer sheath or shell of the waveguide, they may strand at a stranding angle greater than or equal to 80° and the support elements may be stranded so that all surfaces of the shell of the waveguide is covered by a support element. In addition, it is possible that additional elements such as aramide threads will be employed as tension elements with the support elements.

Finally, the entire cable of support elements and waveguides can be provided with an exterior cladding which may be extruded thereon or be formed by wrapping or winding foils which are impregnated with threads thereon.

DESCRIPTION OF THE PREFERRED EMBODIMENTS

Figure 1:
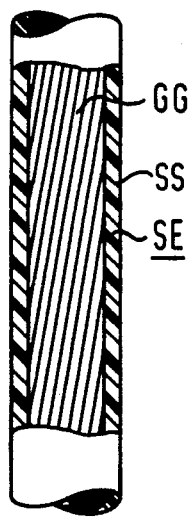
FIG. 1 is a partial longitudinal cross-sectional view of a support element of the present invention.
Figure 2:
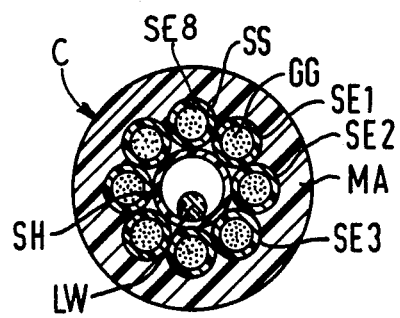
FIG. 2 is a transverse cross-sectional view of a cable constructed in accordance with the present invention.

The principles of the present invention are particularly useful in a cable generally indicated at C in FIG. 2. The cable C has a plurality of support elements SE which as illustrated in FIG. 1 have a core GG consisting of a group of stranded threads or fibers such as glass threads which group is surrounded by a securely positioned protective layer SS which is approximately 20 to 100 $\mu$m thick. In order to be able to use this arrangement as a support element SE, it is necessary that the individual threads of the core GG be impregnated with a corresponding hardening agent. In particular a slow hardening epoxy resin which, during the age hardening, will be baked to combine with the impregnated threads to form a rigid or stiff structure that will protect against buckling but nonetheless will be sufficiently flexible for the winding of the cable onto a spool. Instead of utilizing glass threads, the core GG can also be formed of a plurality of high strength plastic threads or fibers such as aramides fibers.

As best illustrated in FIG. 2, the cable C includes a light waveguide such as an optical fiber LW which is loosely arranged in the interior of a protective covering or sheath SH which has the structure of a hollow wire or shell. However, it is also possible to fill the hollow space within the protective sheath SH with a material which is preferably a soft aerated or foamed plastic or the like or to employ a solid arrangement in which the optical fiber has a soft sheath covering.

On the surface of the core formed by the protective covering SH of the cable, at least one support element SE is applied and is expediently stranded or cabled thereon. In the present instance, it is assumed that the entire surface of the protective covering SH is uniformly occupied by eight support elements SE1, SE2, SE3, . . . , SE8. This will result in a particularly rigid support construction or assembly and an impermissible compression or upsetting of the core, which contains the light waveguide LW, is avoided. Thus, the light waveguide or optical fiber forming the waveguide is protected against both impermissible attenuation increases and mechanical overstressing. The stranded assembly, which consists of the core the support elements stranded in the covering shell SH, is coated with an outer cladding MA so that a sufficiently rigid and protective cable construction will occur. This coating MA may be applied by spraying or by being extruded onto the assembly of the support elements SE and the core are formed by the waveguide LW in the shell SH.

Figure 3:
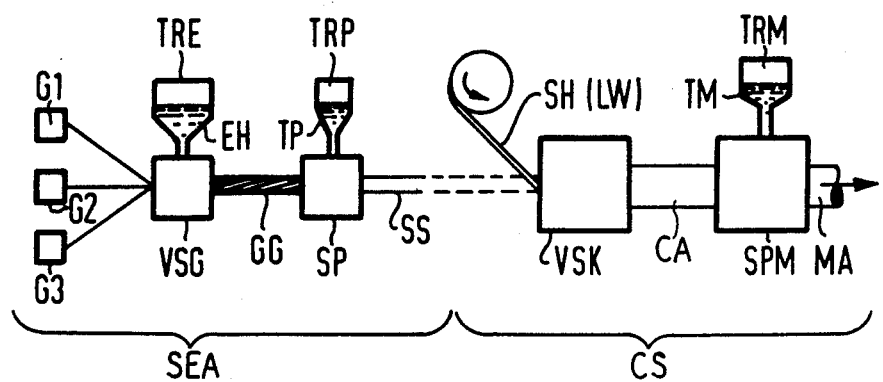
FIG. 3 is a schematic presentation of an apparatus for manufacturing a cable of FIG. 2 in accordance with the present invention.

FIG. 3 schematic illustrates an apparatus SEA for forming the support elements in conjunction with an apparatus or device CS for stranding the support elements with the light waveguide to form the cable. As illustrated, the device SEA has a plurality of coils G1, G2, and G3, which supply threads for the formation of the core GG of the support element. In a first stranding installation VSG, these threads, insofar as the support elements contain several threads, are then stranded together into a group and at the same time are impregnated with a hardening resin EH which is preferably an epoxy resin which is supplied via a funnel TRE. At the output of the first stranding installation VSG, a stranding threaded bundle or group GG which is impregnated with a hardening agent is discharged and directed towards the following extrude SP.

In the extruder SP, a thin protective layer SS is applied of a material TP. The material TP is contained in a funnel TRP. For this purpose, preferably a thermoplastic material is utilized so that the support element can be expediently processed by winding up in a tube stretching or straightening procedure. At the output of the extruder device SP, a support element SE provided with the protective layer SS is thus present and is either applied on a cylinder and age hardened and cured or is directed to a further process such as to an SZ stranding installation VSK of the cable forming apparatus CS.

The cable forming apparatus CS receives a light waveguide LW, which is arranged in its protective covering or sheath SH from a corresponding supply coil. If several support elements are to be stranded or cabled onto the light waveguide shell, then a corresponding number of support element manufacturing apparatus SEA are arranged in parallel to discharge to the cabling apparatus CS. However, it is also possible that if the support elements SE are to be coiled on spools, then a sufficient number of supply spools may be positioned to supply the desired number of support elements SE. In the stranding installation VSK, the desired configuration consisting of the support elements SE and of the core formed by the sheath SH of the light waveguide LW are then combined into a bundle or stranded assembly CA.

The support elements SE are advantageously spun onto the light waveguide core, which is formed by the sheath SH containing the light waveguide LW, with angles exceeding 80°. Subsequently an external or outer cladding MA of a material TM is provided and an extruding device SPM which is connected to a supply of the material TM which is contained in a supply receptacle TRM. A band spinning can also take place of the sheath or outer cladding MA so that a band of material is wrapped onto the bundle to form the external cladding MA. In either way, as the cable leaves the extruding device SPM, the cable has the cladding MA.

If the elements are already age hardened or cured, it is advisable to strand or cable the elements SE up in a long lay procedure or in the case of SZ stranding to place a retaining coil in front of the extruder SPM. If the elements SE are manufactured or stranded in one work cycle, the extruded on cladding can be employed for the purpose of retaining or holding the SZ stranding. Subsequent to the age hardening or curing process, the elements SE are capable of being stressed not only in compression but in the case of a sufficient fixation they are also capable of being loaded in tension. The support elements SE are thus according to this process, matched to the corresponding cladded fibers and are largely free of inner tension. Moreover, the entire arrangement of the cable due to the securely positioned outer cladding MA is also additionally sufficiently safeguarded against buckling.

The support element SE expediently exhibits a breaking strength of equal to or greater than 500 N/mm$^2$ in the case of an E-modulus of greater than or equal to 25,000 N/mm$^2$ core cross section (70,000 N/mm$^2$ relative to glass cross-section). At least in a certain size, they are to be employed alone or possibly with additional tension proof elements for example polyamide threads which coact jointly with the other threads for the purpose of providing a tension relief. Given a sufficiently secure or fixing encasing by the common cladding or a spun or wrapped cover, the compression modulus becomes just as great as the tension modulus. Compression stresses up to a few $10^{-3}$ compression are, according to experience, reversibly possible.

A single cable according to the invention can, example be constructed as follows:

| Element or Part | Diameter ∅ in mm |
| --- | --- |
| Sheath SH | 1.4 |
| Core GG: 1 + 6 glass threads | 0.65 |
| Layer SS: FEP, 0.1 mm thick | 0.85 |
| Assembly of 8 elements stranded | 3.1 |

| -continued | |
| --- | --- |
| onto sheath SH | |
| Cladding MA: PE-cladding 0.7 mm thick | 4.5 |

| Cable Properties | | Element Properties: |
| --- | --- | --- |
| E · A | 90,000 N | 11,250 N |
| Loading (or carrying) Capacity Approx. | 200 N | 25 N |
| Short-term Approx. | 400 N | 50 N |
| Breaking force Approx. | 1,000 N | 125 N |
| Bending Radius Approx. | 40 mm | depends upon mounting (or encasing). |

The compression loading capacity of the cable is dependant upon the compression length. If one is concerned only with the compression forces of the exterior cladding and depending upon the construction of the hollow sheath minus temperatures of 30° to 70° C. without attenuation increases are permissible.

Instead of a extruded cladding MA, a spun cover with threads is possible. It can be obtained by winding with an impregnated foil, that has reinforcing threads, onto an assembly CA of support elements and the waveguides in the shell.

Although various minor modifications may be suggested by those versed in the art, it should be understood that we wish to embody within the scope of the patent granted hereon, all such modifications as reasonably and properly come within the scope of our contribution to the art.

We claim:

1. A method for manufacturing an optical cable having support elements, which consists of stranded threads impregnated with a hardening resin and covered by a protective layer, being stranded onto a protective covering containing a light waveguide, said method comprising the steps of providing each of the support elements by providing a plurality of threads, stranding said threads together into a group, impregnating each of the groups of stranded threads with a hardening resin, subsequently covering each of the impregnated groups with a protective layer to produce the support element; subsequently providing a light waveguide received in a protective covering; and stranding the support elements onto the protective covering of the waveguide to form the cable, said protective layer permitting a subsequent hardening of the resin.

2. A method according to claim 1, wherein the step of impregnating utilizes a hardening resin having a slow hardening time and composed of an epoxy resin.

3. A method according to claim 1, wherein the step of covering provides a protective layer consisting of a thermoplastic layer.

4. A method according to claim 1, wherein the step of covering provides a protective layer with a thickness in a range of 20 to 100 μm.

5. A method according to claim 1, wherein the step of stranding the support elements strands the elements on the protective covering at a stranding angle equal to or greater than 80°.

6. A method according to claim 1, wherein the step of stranding covers the entire surface of the protective covering of the waveguide with support elements.

7. A method according to claim 1, wherein the step of providing a plurality of threads provides glass threads.

8. A method according to claim 1, wherein the step of providing a plurality of threads provide aramide fibers.

9. A method according to claim 1 which includes heating the entire cable to a moderate temerature for the purpose of age hardening the resin impregnating the threads of the support elements.

10. A method according to claim 1, wherein the support elements are stranded on the covering of the waveguide in an SZ manner.

11. A method according to claim 1 which includes applying an outer cladding layer on the external surfaces of the stranded support elements.

12. A method according to claim 11, which includes heating the entire cable to a moderate temperature for the purpose of age hardening the resins that impregnate each of the group of threads of the support elements.

13. A method according to claim 11, wherein the step of applying the outer cladding extrudes the cladding onto the support elements.

14. A method according to claim 13, wherein the step of extruding is conducted at an elevated temperature which acts to heat the support elements for purposes of curring the impregnating resin of the support elements.

15. A method for manufacturing an optical cable having support elements, which consists of stranded threads impregnated with a hardening resin and covered by a protective layer, being stranded onto a protective covering containing a light waveguide, said method comprising the steps of providing each of the support elements by providing a plurality of threads, stranding said threads together into a group, impregnating each of the groups of stranded threads with a hardening resin, subsequently covering each of the impregnated groups with a protective layer to produce the support element, hardening the resin; subsequently providing a ligght waveguide received in a protective covering; stranding the support elements onto the protective covering of the waveguide to form the cable, and hardening the resin with at least the completion of the hardening occurring after the completion of the stranding step.

* * * * *